Figure 1A:
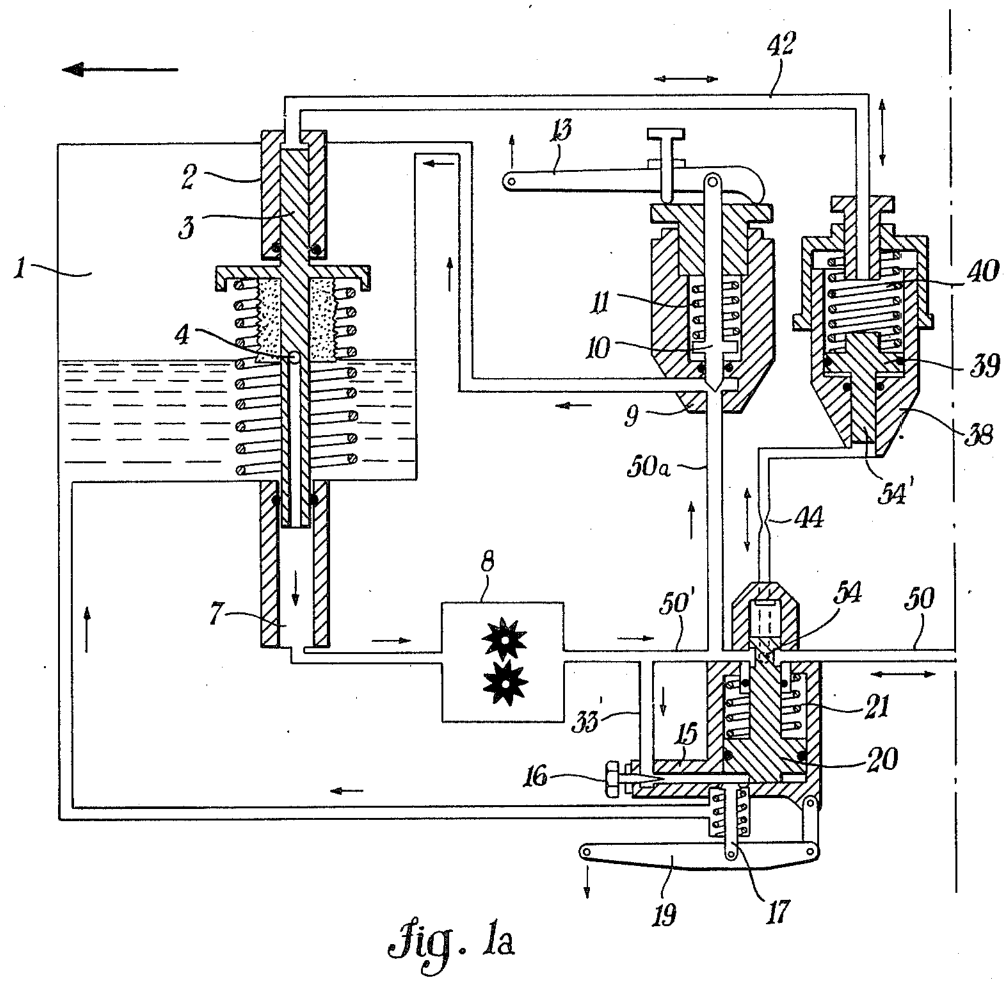
Figure 1B:
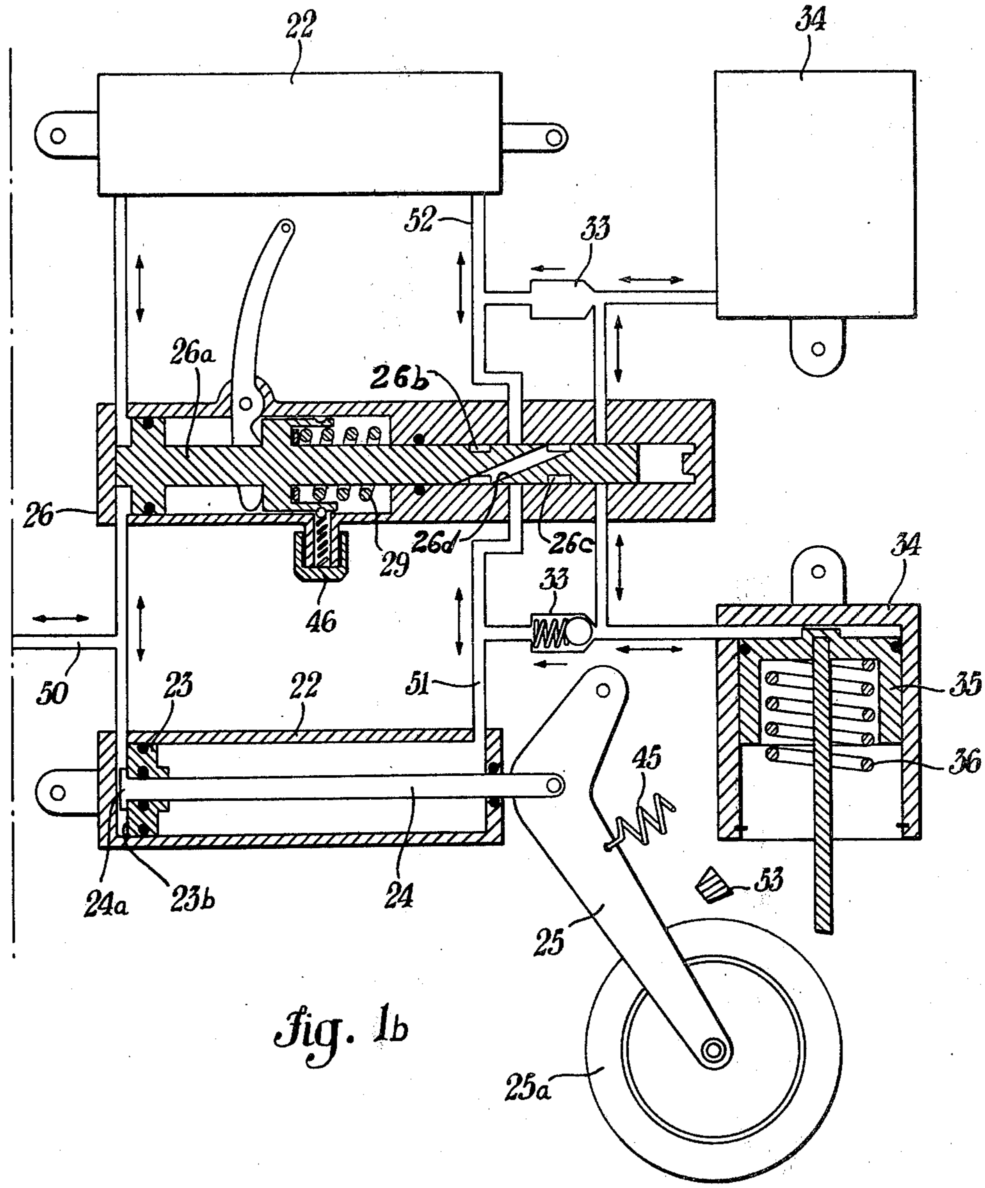

United States Patent [19]
Gigli

[11] 3,980,150
[45] Sept. 14, 1976

[54] MOTORCYCLE AUXILIARY SUPPORT SYSTEM

[76] Inventor: Mario Gigli, No. 429, Via Flaminia, Rome, Italy

[22] Filed: Jan. 16, 1975

[21] Appl. No.: 541,634

[30] Foreign Application Priority Data

Jan. 25, 1974 Italy .................................. 47930/74

[52] U.S. Cl. .............................. 180/30; 180/105 R; 280/767; 280/293

[51] Int. Cl.[2] .......................................... B62D 61/12

[58] Field of Search........... 180/30, 105 R; 280/293, 280/296, 150 A

[56] References Cited

UNITED STATES PATENTS

| | | | |
|---|---|---|---|
| 1,300,772 | 4/1919 | Purdy | 180/30 |
| 2,398,541 | 4/1946 | Leach | 180/30 X |
| 2,589,023 | 3/1952 | Pattner | 180/30 |
| 2,960,351 | 11/1960 | Jeffress | 280/293 |
| 3,236,323 | 2/1966 | Austin | 180/30 |
| 3,373,832 | 3/1968 | Summers | 180/30 |
| 3,410,357 | 11/1968 | Summers | 180/30 |
| 3,465,840 | 9/1969 | Summers | 180/30 |
| 3,700,059 | 10/1972 | Sutton | 180/30 |
| 3,811,704 | 5/1974 | Gregoric | 280/293 X |

*Primary Examiner*—M. H. Wood, Jr.
*Assistant Examiner*—John P. Silverstrim
*Attorney, Agent, or Firm*—Olson, Trexler, Wolters, Bushnell & Fosse, Ltd.

[57] ABSTRACT

An automatic undercarriage system for a motorcycle or the like is disclosed, for balancing of the same at still or low running speeds, including a pair of wheeled arms mounted on the frame of the motorcycle and operated by hydraulic cylinders by a displacement pumps connected to the motorcycle transmission so that when the motorcycle starts moving said undercarriage is lifted, and including means for lowering it when the motorcycle is sharply braked and/or comes to still.

4 Claims, 2 Drawing Figures

MOTORCYCLE AUXILIARY SUPPORT SYSTEM

Object of the invention is a system which enables two-wheeled vehicles to maintain their running position by means of an automatically intervening retractable undercarriage, be they at low speeds or stationary.

Generally, in the case of motor cycles when stationary, support is provided by a stand which comes to be placed between ground and motor cycle or by a kick stand which provides support at a certain angle, both systems not allowing the vechicle to move off without their preliminary manual retraction.

This invention consists in that such vehicles, be they at low speeds or stationary, maintain their running position independently of the inclination of the ground with no intervention whatsoever on behalf of the rider and that it offers the following advantages:

1. the vehicle may be handled more easily, its balance being ensured by the undercarriage, and, by means of its own propulsion, said vehicle has the possibility of reversing;
2. it facilitates moving through traffic, the rider having only to carry out those actions related to driving, said actions being more easily executed owing to the total availability of the legs to operate brake and gears;
3. the danger in falling when braking sharply is reduced, as locking of the rear wheel causes the automatic lowering of the undercarriage;
4. the possibility of automatically adjusting the proper rear trim of the vehicle in relation to the load being carried, rider alone or rider plus passenger;
5. the possibility, when braking of automatically maintaining the horizontal attitude of the vehicle which, due to momentum and the consequent torque generated by its center of gravity with respect to the ground, lifts its rear part, thereby increasing the lbs. ft. of said torque and the load on the front wheel;
6. the possibility of applying a cockpit to said vehicles with the benefits that such a solution would entail, be it for the rider's protection in case of impact or falling, be it for aerodynamic reasons, be it for the comfort obtainable similar to that of an automobile.

DESCRIPTION AND OPERATION

With reference to the attached drawing, the undercarriage in question comprises two legs, designated with numeral 25, hinged to the frame (not shown) between, and parallel to, the wheel axles, having independent angles of rotation, to the lower ends of which are attached two tired wheels **25*a***, which swivel so as to follow the direction of movement freely, or are linked to the steering mechanism so as to follow the curvation radius, or are fixed, and with a special tread.

The undercarriage track may be equal to the maximum width of the vehicle and its automatic activation occurs in the following manner: When the vehicle is moving, small oleodynamic pump 8, in association with the rotation of the rear wheel, (not shown), sucks through a pipe 7 a certain quantity of oil from air tight tank 1 previously set in negative pressure with respect to environment and forwards it to two cylinders 22, the pistons 23 which are free to slide on the rods 24, said pistons engaging the head **24*a* of said rods 24. The rods 24 are connected to the two legs 25, cause them to rise, under the returning action of springs 45 that is to say, the undercarriage to be retracted. This is made possible by the effect of a pressure distributor 26 inserted in the delivery circuit 50 of the pump 8, said distributor 26 including a spool 26*a* moveable from a home position shown in the drawing to an open position at which annular grooves 26*b* and 26*c* connected by bore 26*d* connect secondary circuit pipes 51 and 52 connected with the rear face of pistons 23 slidable within said cylinders 22 and thus allowing oil to flow out of the cylinders 22 and between the secondary circuits including pipes 51 and 52. Said oil of the secondary circuit 51, 52 acting on two pistons 35 positioned at the base of the rear suspension springs 36**, provides the proper running trim of the vehicle.

The pump 8, continuing to rotate, and having exhausted the quantity of oil contained in the tank 1 will then act as a ballast for pressure in the primary circuit 50, said pressure diminishing in proportion to vehicle speed and the consequential delivery of the pump 8, as an adjustable nozzle including a seat 9 and a needle 10, inserted in the delivery circuit, (branch **50*a*) allows for the return into the tank 1**.

In fact, the pressure in the primary circuit **50, 50*a* is determined by the delivery pump 8 and the discharge controlled by nozzle 9, 10.**

As the pressure in the primary circuit 50 diminishes, so will that in the secondary circuit 51, 52 until the weight of the vehicle will cause the oil to be pumped from the cylinder 34 towards cylinders 22 and pistons 23 which will displace the rod 24 with the engagement of the heads **24*a* against the face 23*b* of the pistons 23 causing the lowering of the undercarriage 25, its wheels 25*a* to adapt to the terrain, the cylinders 22 and 34 being intercommunicating by means of the pressure distributor 26 and the passageways 26*b*, 26*c* and 26*d*, and the consequential distribution of the weight of the rear part of the vehicle onto three resilient points (rear wheel and the two wheels 25*a***).

With the further diminishing of vehicle speed, of pump 8 delivery and pressure of primary circuit 50, the spool **26*a* of the pressure distributor 26, due to the effect of suitably registered spring 29, will return home and close, with a latching action caused by lock 46, the communication between cylinders 34 and 22 and thereby blocking the quantity of oil present in each undercarriage 25 cylinder 22 and provide the vehicle with vertical stability despite the variation in its trim resulting from unloading of the weight carried, as each spring 36 cylinder 34 communicates its pressure, via check valve 33, to the undercarriage 25 cylinder 22** on the same side, thereby maintaining the distribution of vehicle weight over four wheels.

Undercarriage 25 operating time is obtained by adjusting of the exhaust nozzle 9, 10, said adjustment being also manually controlled by operating the lever 13 against the spring 11, in the sense of the arrow causing a greater opening of the nozzle 9, 10.

At present, to compensate for variations in the load being carried — rider alone or rider plus passenger — motor cycles are equipped with adjustable double action shock absorber, and suitably registered springs, in particular for rear suspension units which are, in fact, effected most by this variation, but notwithstanding, there is a very obvious difference in trim in relation to the aforesaid load.

The oleodynamic system of the present invention allows the trim of the rear part of the vehicle to be automatically adjusted. This possibility is afforded by the greater diameter of the spring 36 seat cylinders 34 with respect to the cylinders 22 of the legs 25, resulting, in relation to the stroke of the respective pistons 35, in a greater stroke of the undercarriage pistons 23, the undercarriage 25 being able to attain the position of maximum lowering when the spring pistons 35 are at the end of their stroke, that is to say, after having pumped all the oil contained in the cylinders 34, while, at approximately mid-stroke position, corresponding to a running trim with a lighter load, the undercarriage is in the position of maximum retraction, this position being defined by rubber buffers 53.

Regulation of piston 35 stroke acting against the spring 36 load is determined by pilot valve 38 which, inserted in the primary circuit 50, 50*a*, equipped with a small, low-diameter plunger 54, urged by suitably registered spring 40, senses pressure variations in the circuit through stabilizing nozzle 44 and by means of piston 39, against the action of the spring 40, through pipe 42 displaces piston 3 in the cylinder 2, by hydraulic action, and consequently spill-way tube 3 with its hole 4 which slides inside the tank 1 outflow pipe 7 and will lower it and cause the pump 8 to suck through a greater quantity of oil and the consequential displacement of the undercarriage pistons 23 in the cylinders 22 which, being unable to move the legs any further as these have reached home in the raised position against the buffers 53, by sliding along rods 24, pump the oil of the secondary circuit 51, 52, displacing the spring 36 pistons 35, the springs 36 being loaded in relation to the increase in weight, thereby maintaining the normal rear trim of the vehicle.

The undercarriage 25 will be kept in the raised position by the pressure in the primary circuit acting on the rods 24 and by springs 45, loaded to counter the vehicle weight, reducing the pump work in the initial phases, i.e. until the legs come to rest against the rubber buffers.

The pump 8 stopper effect to maintain the pressure inside circuits 50, 51, 52 of the undercarriage 25 is eliminated by timed valve 15 which, interposed in the primary circuit 50′ between pump 8 and adjustable nozzle 9, 10, is controlled by the working pressure which, being transmitted through pipe 33′ and adjustable meter 16 that sets the operating time, moves piston 20 which, linked with a checking valve 54, compresses spring 21, closes said circuit 50 downstream of the nozzle 9, 10 blocking the oil inside the pressure distributor 26, in the cylinders 22 and inside the pilot valve 38, thereby excluding any automatism.

Residual pressure will be relieved by by-pass into pipe 50*a*, allowing the pump 8 to rotate idle with negligible friction, its task only being that of circulating a small quantity of oil useful for its lubrification, but under no pressure, inside the nozzle 9, 10 and the tank 1, until the foot brake pedal is activated, said brake being linked to the lever 19 actuating a small valve 17 positioned in the timed valve 15, said activation causing the valve 54 to be opened with the subsequent release of pressure and return home of the primary circuit 50′ check valve 54, thereby immediately restoring full automatism to the undercarriage.

The possibility of maintaining normal vehicle trim while sharply braking is provided, in the automatism of this undercarriage, by the backward positioning in the tank with respect to the direction of movement, of the pump suction pipe hole 4, the pump 8, acting as a plug, in case of sharp braking, will not be able to circulate all that oil previously established by the pilot valve 38 insofar as part of said oil will, by the effect of inertia, wash against the front wall of the tank 1, the inclination of which may regulate the effect of the quantity displaced, causing the rear suspension springs 36 to unload proportionally to the speed of the vehicle and intensity of braking.

Furthermore, the automatism of this undercarriage, because it completely frees the rider from having to balance the vehicle, be it at low speeds or stationary, enables a completely enclosing cockpit to be fitted to the aforesaid vehicles which, apart from the already mentioned advantages, maintains and improves those of a vehicle highly suited to high and low speeds — a substantial problem at this time — and allows the rider to dispense with particular clothing gear even in inclement weather conditions.

Having thus described the present invention, what is claimed is:

1. A motorcycle auxiliary support system comprising: a pair of swingably mounted arms respectively on each side of the motorcycle and carrying auxiliary wheels and movable between retracted and lowered positions; retracting spring means connected between said arms and the motorcycle for biasing the arms to the retracted position; an oil container mounted on the motorcycle; a pair of hydraulic cylinders respectively at opposite sides of the motorcycle adjacent one of said arms and each including a rod slidable therein and connected with an adjacent one of said arms, and a piston slidable on said rod but engaging therewith for actuating said rod so as to move said adjacent arm to said lowered position; a displacement pump connected between said container and first ends of said cylinders and operated in response to one of the motorcycle wheels for pumping oil from said container to said cylinders, said oil pressure increasing with increasing vehicle speed to move said piston out of engagement with said rod such as to allow said retracting spring to move said arm to said retracted position; a pressure distributing cylinder having a spool movable between opened and home positions and operated toward said opened position by said oil pressure from said pump, a spring biasing said spool to said home position, and a means for locking said spool in said home position, said spool having first and second annular grooves and a bore interconnecting said grooves; two hydraulic suspension cylinders respectively disposed on opposite sides of a rear wheel of the motorcycle and having a piston bearing on a suspension spring of the motorcycle; first oil lines connecting second ends of said pair of cylinders with said first annular groove when said spool is in said opened position; second oil lines connecting said suspension cylinders with said second annular groove when said spool is in said opened position; third oil lines connecting said second ends of said pair of cylinders with the adjacent one of said suspension cylinders; and one-way check valves in said third oil lines for allowing the passage of oil from a suspension cylinder to an associated hydraulic cylinder as pressure in the hydraulic cylinders from said pump decreases upon a reduction of speed of the motorcycle, and thereby causing said pistons to actuate said rods for lowering said arms against the action of said retracting spring means.

2. A motorcycle auxiliary support system as defined in claim 1, which includes a checking valve connected between said pump and said first end of said pair of hydraulic cylinders for returning oil through an oil return circuit to the container during normal running of the motorcycle.

3. A motorcycle auxiliary support system as defined in claim 2, which includes an adjustable nozzle connected in said oil return circuit having a seat and a needle valve, and a screw actuated lever connected with the needle valve for manually controlling the position of the needle valve within said seat.

4. A motorcycle auxiliary support system as defined in claim 2, which includes a cylinder disposed within said oil container, an oil delivery duct extending from said container toward said pump, a spring loaded piston slidably disposed within both said cylinder and said delivery duct, a pilot valve connected between said last-mentioned cylinder and said checking valve and including a small piston and a spring acting on said small piston, said pilot valve being connected with said checking valve by a duct having a stabilizing nozzle sensing the pressure of said pair of hydraulic cylinders, said pilot valve being connected with said cylinder in the oil container and controlling oil hydraulically acting on said spring loaded piston for adjusting said last-mentioned piston between raised and lowered positions, said last-mentioned piston including a passageway therethrough having an inlet hole communicating with the interior of said container and controlling the amount sucked by said pump in accordance with the level of said hole within said container.

* * * * *